(12) United States Patent
Bottner et al.

(10) Patent No.: US 9,135,267 B2
(45) Date of Patent: Sep. 15, 2015

(54) METHOD FOR ADDING REAL TIME COLLABORATION TO EXISTING DATA STRUCTURE

(71) Applicant: Google Inc., Mountain View, CA (US)

(72) Inventors: Keith Charles Bottner, Manly (AU); Reuben Kan, Epping (AU)

(73) Assignee: GOOGLE INC., Mountain View, CA (US)

( * ) Notice: Subject to any disclaimer, the term of this patent is extended or adjusted under 35 U.S.C. 154(b) by 266 days.

(21) Appl. No.: 13/837,827

(22) Filed: Mar. 15, 2013

(65) Prior Publication Data

US 2015/0199374 A1   Jul. 16, 2015

(51) Int. Cl.
    *G06F 17/30* (2006.01)
(52) U.S. Cl.
    CPC ................ *G06F 17/30165* (2013.01)
(58) Field of Classification Search
    None
    See application file for complete search history.

(56) References Cited

U.S. PATENT DOCUMENTS

| 2005/0034079 A1* | 2/2005 | Gunasekar et al. | 715/753 |
| 2009/0327358 A1* | 12/2009 | Lukiyanov et al. | 707/203 |
| 2013/0326323 A1* | 12/2013 | Siwoff et al. | 715/229 |
| 2014/0033013 A1* | 1/2014 | Shaver | 715/230 |
| 2014/0281875 A1* | 9/2014 | Branton et al. | 715/230 |

* cited by examiner

*Primary Examiner* — Wilson Lee
(74) *Attorney, Agent, or Firm* — Ropes & Gray LLP

(57) ABSTRACT

Systems and methods for establishing a bridge between two documents on a server are provided, including receiving, at the server, a first document represented by a hierarchical data structure model having a plurality of first nodes, generating, by a processor, a second document represented by a flat data structure model having a plurality of flat data structure elements, and establishing, by the processor, the bridge between the first document and the second document. Establishing the bridge includes linking each of the plurality of first nodes to the plurality of flat data structure elements, and maintaining the bridge, such that an edit to the first document, represented in at least one of the first nodes, is applied to at least one corresponding flat data structure element, thereby applying the edit to the second document.

17 Claims, 9 Drawing Sheets

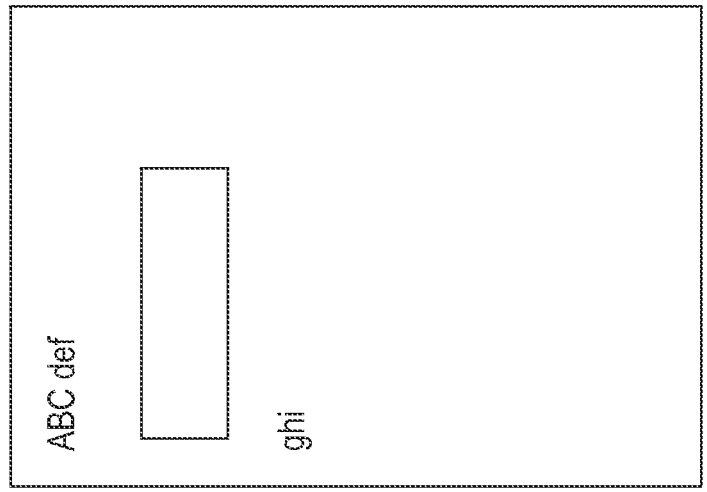

METHOD FOR ADDING REAL TIME COLLABORATION TO EXISTING DATA STRUCTURE

BACKGROUND

During development of an electronic document, it is often desirable to have multiple reviewers propose changes to and comment on a draft of the electronic document. For example, an author may create an initial draft of an electronic document and send a copy of the electronic document to multiple reviewers for revisions and comments. Common document models do not allow multiple users to simultaneously edit an electronic document. Instead, each reviewer may independently propose changes or make comments in the electronic document and return a revised version of the electronic document back to the author. However, since the reviewers cannot see each other's revisions, each of the reviewers creates a unique version of the electronic document, each of which may include conflicting changes. The original author will resolve the conflicting changes and may re-send updated copies of the electronic document to the reviewers. These steps are repeated until the author and all of the reviewers are satisfied with a version of the electronic document.

SUMMARY

Systems and methods are provided for real time collaboration to any electronic document format, including electronic document formats represented by a hierarchical data structure. In particular, systems and methods are provided to allow multiple users to edit an electronic document at the same time. Systems and methods are provided to allow multiple users to simultaneously edit an electronic document that is represented by a hierarchical data structure.

According to one aspect, a method of establishing a bridge between two documents on a server comprise receiving, at the server, a first document represented by a hierarchical data structure model having a plurality of first nodes, generating, by a processor, a second document represented by a flat data structure model having a plurality of flat data structure elements, the second document being an online collaboratively editable document, and establishing, by the processor, the bridge between the first document and the second document. Establishing the bridge includes linking the plurality of first nodes to the plurality of flat data structure elements, such that at least a portion of contents of the plurality of first nodes is copied to the plurality of flat data structure elements, and maintaining the bridge, such that an edit to the first document, represented in at least one of the first nodes, is applied to at least one corresponding flat data structure element, thereby applying the edit to the second document.

In some implementations, the method further comprises detecting an edit to the first document, and applying the edit to the second document, based on the bridge linking the plurality of first nodes and the plurality of flat data structure elements. Applying the edit to the second document may include using operational transformation to apply the edit. In other implementations, maintaining the bridge further comprises applying an edit to the second document, represented in at least one of the flat data structure elements, to at least one corresponding first node, thereby applying the edit to the first document. In one implementation, at least one of the plurality of flat data structure elements contains no data.

According to one implementation, the method further comprises generating a copy of the second document represented by an additional flat data structure having a plurality of additional flat data structure elements, and establishing an additional bridge between the copy and the second document, such that an edit to the second document is applied to the copy. The edit to the first document is applied to the second document via the bridge, and is applied from the second document to the copy via the additional bridge.

According to some implementations, the method further comprises distributing a plurality of first copies of the first document to a plurality of second processors, each first copy represented by respective hierarchical data structure models and a plurality of corresponding second copies, each second copy represented by respective flat data structure models. In one example, a change to one of the first copies is applied to a corresponding one of the second copies, the change to the corresponding one of the second copies is applied to the second document and the plurality of second copies, the change to the second document is applied to the first document, and the change to the plurality of second copies is applied to the plurality of first copies. In some implementations, a first user editing the first document collaborates in real time with a second user editing one of the plurality of first copies.

According to one aspect, a system for establishing a bridge between two documents comprises a server, configured to store the two documents, a receiver, coupled to the server, for receiving a first document represented by a hierarchical data structure model having a plurality of first nodes, and a first processor, coupled to the server, for generating a second document represented by a flat data structure model having a plurality of flat data structure elements, the second document being an online collaboratively editable document, and for establishing the bridge between the first document and the second document. Establishing the bridge includes linking each of the plurality of first nodes to the plurality of flat data structure elements via a linkage, such that at least a portion of contents of the plurality of first nodes is copied to the plurality of flat data structure elements, and maintaining the bridge, such that an edit to the first document, represented in at least one of the first nodes, is applied to at least one corresponding flat data structure element, thereby applying the edit to the second document.

In some implementations, the first processor is further configured to detect an edit to the first document, and apply the edit to the second document, based on the linkage between the plurality of first nodes and the plurality of flat data structure elements. The processor may be configured to maintain the bridge such that an edit to the second document, represented in at least one of the flat data structure elements, is applied to at least one corresponding first node, thereby applying the edit to the first document.

According to one implementation, the system further comprises a transceiver, configured to transmit a copy of the second document to a user device including a second processor, wherein the copy is represented by an additional flat data structure having a plurality of additional flat data structure elements, and wherein the first processor is configured to establish an additional bridge between the copy and the second document, such that a first edit to the second document is applied to the copy. The first processor may be configured to apply the edit to the first document to the second document via the bridge, wherein the transceiver is configured and to apply the edit from the second document to the copy via the additional bridge.

In some implementation, the system further comprises a transceiver, configured to transmit a first copy of the first document to a user device including a second processor, wherein the first copy is represented by an additional hierarchical data structure having a plurality of additional nodes, wherein the second processor is configured to generate a second copy represented by an additional flat data structure having a plurality of additional flat data structure elements, and a second bridge between the first copy and the second copy, and wherein the first processor is configured to establish a third bridge between the second copy and the second document, such that a first edit to the second document is applied to the second copy. In one example, the second processor applies a change to the first copy to the second copy via the second bridge, the user device transmits the change to the first processor, and the first processor applies the change to the second document and to the first document via the bridge.

According to another aspect, a method for collaboratively editing an electronic document comprises displaying a first copy of the electronic document in a hierarchical data structure format on a first device, displaying a second copy of the electronic document on a second device, receiving edits to the first copy on the first device, propagating the edits from the first copy to the second copy substantially instantaneously, and displaying the edits to the second copy on the second device, thereby allowing for real time collaboration between a first user editing the first copy and a second user editing the second copy.

In one implementation, the method further comprises receiving edits to the second copy on the second device, propagating the edits from the second copy to the first copy substantially instantaneously, and displaying the edits in the first copy in the hierarchical data structure format on the first device. In some examples, the second copy of the electronic document is displayed in a hierarchical data structure format on the second device. In other examples, the second copy of the electronic document is displayed in a flat data structure format on the second device.

BRIEF DESCRIPTION OF THE FIGURES

The above and other advantages of the disclosure will be apparent upon consideration of the following detailed description, taken in conjunction with the accompanying drawings, in which like reference characters refer to like parts throughout, and in which:

FIG. 3A depicts an example of sample text from an electronic document, according to an illustrative embodiment;

DETAILED DESCRIPTION

Systems and methods are provided for real time collaboration using a hierarchical and/or flat data structure electronic document format. In particular, systems and methods are provided to allow multiple users to simultaneously edit and/or comment on an electronic document at the same time, each using an editing program that stores the electronic document as a hierarchical data structure or an editing program that stores the electronic document as a flat data structure. According to one implementation, a hierarchical data structure copy of a document is mapped to a flat data structure copy of a document via a bridge, such that edits to the hierarchical data structure copy are mapped to the flat data structure copy. Once the edits are implemented in the flat data structure copy, they are propagated to other flat data structure copies on other user devices. Other users can view the revised document using either a flat data structure electronic document format or using a hierarchical data structure electronic document format. If other users are using a hierarchical data structure electronic document format, the revisions are individually mapped from the flat data structure format to the hierarchical data structure format via a bridge.

Figure 1A:
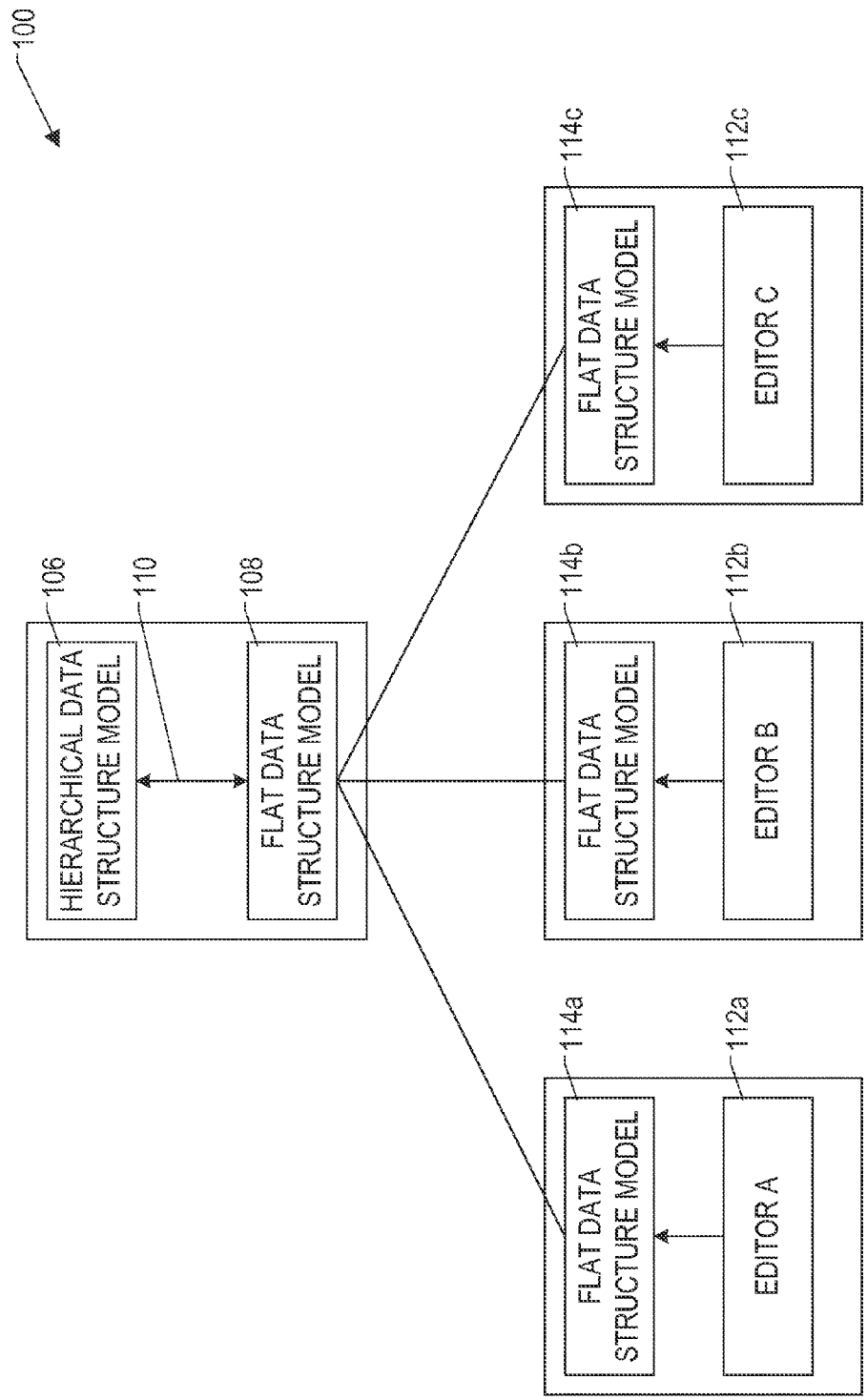
FIG. 1A depicts a block diagram showing a bridge between a hierarchical data structure model and a flat data structure model of an electronic document for real time collaboration, according to an illustrative embodiment.

FIG. 1A depicts a block diagram 100 showing a bridge 110 between a hierarchical data structure model 106 and a flat data structure model 108 of an electronic document, according to an illustrative embodiment. In one example, the hierarchical data structure model 106 is a MICROSOFT® Word file, and the flat data structure model is a GOOGLE® Document file. In other examples, other hierarchical or flat data structure models may be used. The flat data structure model of the electronic document can be used for multiple users to collaborate in real time, allowing the users to simultaneously edit the document from different devices. Edits or comments entered in one copy of the electronic document are transmitted and uploaded to other copies of the document. In one example, edits or comments are transmitted between copies of the document using operational transformation.

The block diagram 100 shows three copies of the flat data structure model 108 of the electronic document: a first copy 114a, a second copy 114b and a third copy 114c. As shown in FIG. 1A, a first editor 112a may edit or comment on the first copy 114a of the electronic document, a second editor 112b may edit or comment on the second copy 114b of the electronic document, and a third editor 112c may edit or comment on the third copy 114c of the electronic document. Any edits or comments to any of the first 114a, second 114b or third 114c copies of the electronic document are transmitted to the flat data structure model 108, and immediately propagated to the other copies of the electronic document. Thus, edits to any copy of the electronic document appear in the other copies nearly simultaneously, allowing multiple users to collaborate in revising the document in real time. In one example, another editor may edit or comment on either the hierarchical data structure model 106 of the electronic document or the flat data structure model 108 of the electronic document, and the edits and/or comments would appear in the first 114a, second 114b and third 114c copies.

Figure 1B:
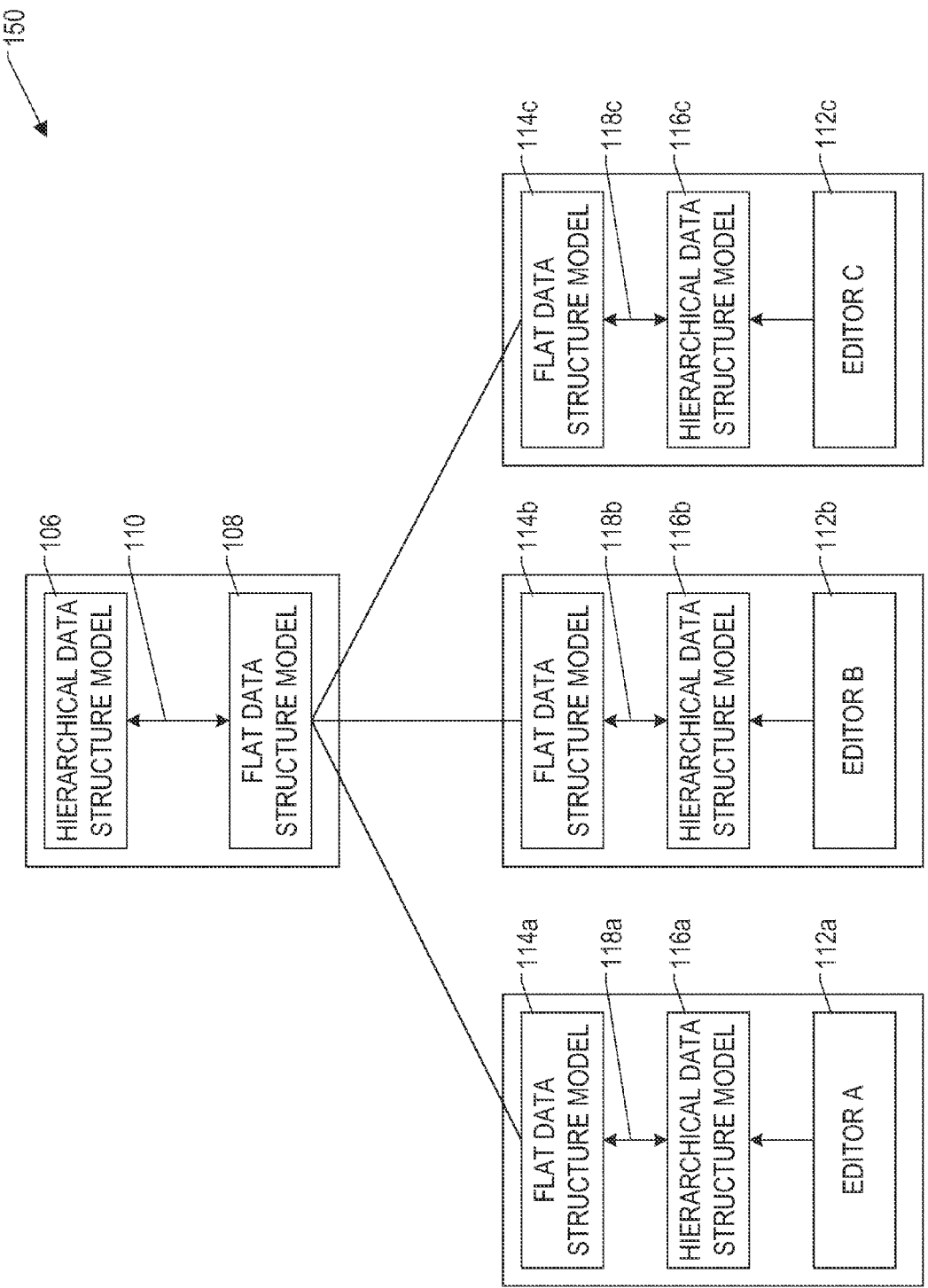
FIG. 1B depicts a block diagram showing multiple bridges between hierarchical data structure models and a flat data structure model of an electronic document for real time collaboration, according to an illustrative embodiment.

FIG. 1B depicts a block diagram 150 showing multiple bridges 110, 118a, 118b and 118c between hierarchical data structure models 106, 116a, 116b and 116c and flat data structure models 108, 114a, 114b and 114c of an electronic document, according to an illustrative embodiment. As described above with respect to FIG. 1A, the flat data structure model of the electronic document can be used for multiple users to collaborate in real time, allowing them to simultaneously edit the document. Edits or comments entered in one copy of the electronic document are transmitted and uploaded to other copies of the document. As shown in FIG. 1B, multiple bridges can be used to allow users to edit copies of the document using a program that has a hierarchical data structure format, and also see other users edits and comments as they are entered on other copies of the document.

The block diagram 150 shows the three copies 114a, 114b and 114c of the flat data structure model 108 of the electronic document. Each of these copies is bridged to a hierarchical data structure model copy of the electronic document, allowing users to edit the document using a hierarchical data structure format. The first copy 114a is mapped to a first hierarchical data structure model copy 116a via the first bridge 118a. The second copy 114b is mapped to a second hierarchical data structure model copy 116b via the second bridge 118b. The third copy 114c is mapped to a third hierarchical data structure model copy 116c via the third bridge 118c. When the first 112a, second 112b and third users 112c edit or comment on the respective first 116a, second 116b and third 116c hierarchical data structure model copies, the edits and/or comments are mapped to the respective first 114a, second 114b and third 114c flat data structure model copies using the respective first 118a, second 118b and third 118c bridges. As shown in FIG. 1A, any edits or comments to any of the first 114a, second 114b or third 114c flat data structure copies of the electronic document are transmitted to the flat data structure model 108, and immediately propagated to the other flat data structure copies of the electronic document. The first 118a, second 118b and third 118c bridges are then used to map the documents to the first 116a, second 116b and third 116c hierarchical data structure model copies, thereby propagating the changes to the hierarchical data structure copies 116a, 116b and 116c. Thus, using the flat data structure copies 114a, 114b and 114c, and the bridges 118a, 118b and 118c, edits to any hierarchical data structure model copy 106, 116a, 116b and 116c of the electronic document appear in the other copies almost simultaneously, allowing multiple users to collaborate in revising the document in real time. The bridges between the hierarchical data structure model copy and the flat data structure model map edits from the hierarchical data structure model copy to the flat data structure model copy and from the flat data structure model copy to the hierarchical data structure model copy. Thus, in some implementations, the master document is a flat data structure model, which is bridged to a hierarchical data structure model, the copies 114a, 114b, and 114c are hierarchical data structure model copies, and the bridges 118a, 118b, and 118c map to flat data structure copies.

Figure 2:
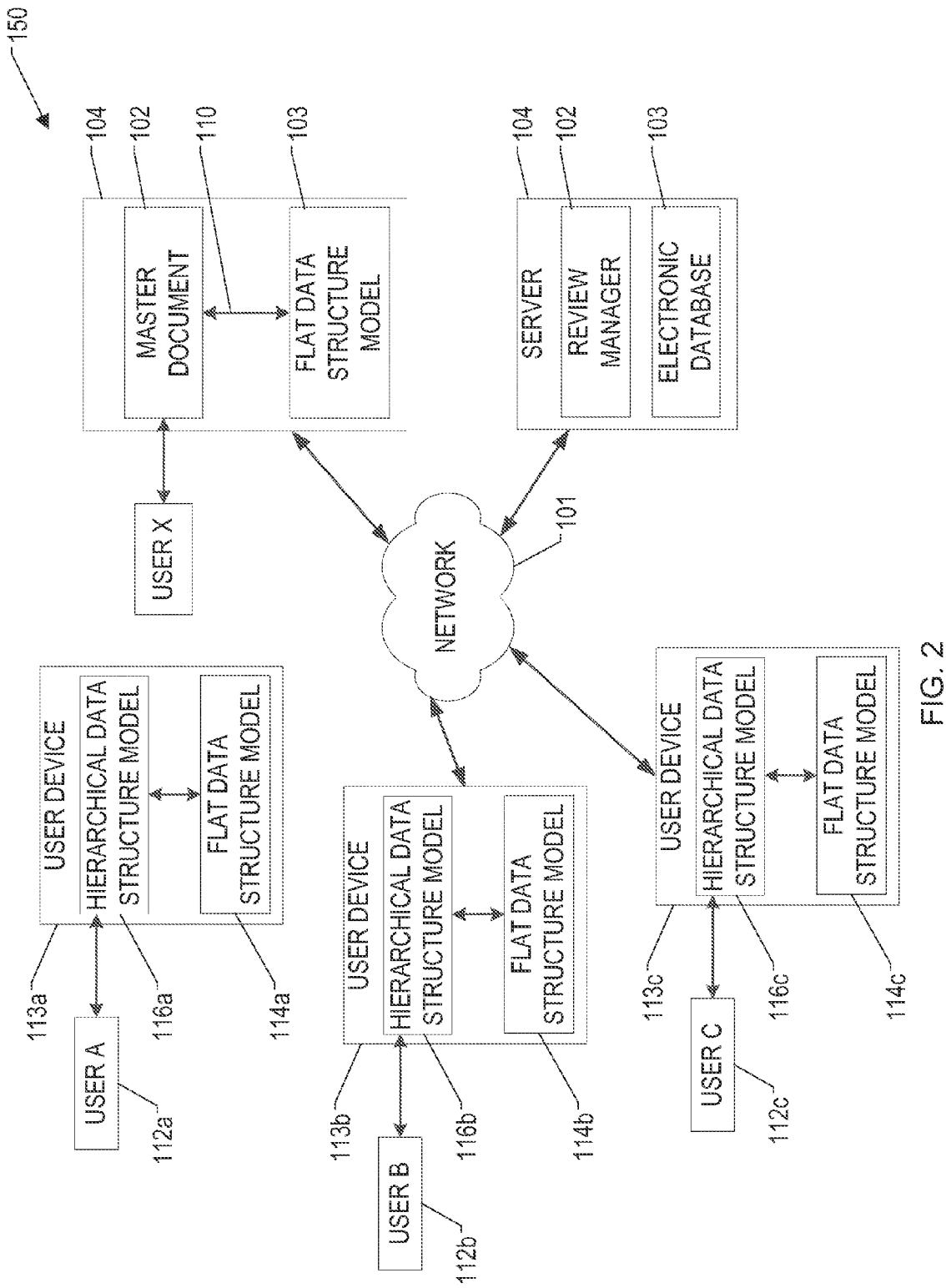
FIG. 2 depicts a block diagram of a computerized system for real time collaboration for editing an electronic document, according to an illustrative embodiment.

FIG. 2 depicts a block diagram of a computerized system 200 for real time collaboration for editing an electronic document, according to an illustrative embodiment. The system 200 includes a server 104 and four user devices 113a-113d connected over a network 101. The master electronic document 106 is formatted in a hierarchical data structure format, and the bridge 110 is used to create a flat data structure format copy 108 of the document. Each of the user devices 113a-113c includes a copy 114a-114c of the original flat data structure copy 108. The network is used to transmit changes as reflected in each of the flat data structure copies 108 and 114a-114c to the other flat data structure copies. The system 200 includes a server 104, which may include a review manager 102, which manages updates to various versions of the master document 106. In some implementations, the server 104 is connected directly to the user device 113d and the master document 106.

In one implementation, any edits or comments to any of the flat data structure copies 114a-114c are transmitted through the network 101 to the original flat data structure copy 108 on the user device 113d. Once the edits or comments are entered into the original flat data structure copy 108, they are retransmitted to the other flat data structure copies 114a-114c. Edits or comments to the flat data structure copies 108 and 114a-114c are then mapped to the respective hierarchical data structure copies 106 and 116a-116c via the respective bridges 110 and 118a-118c.

In one implementation, the review manager 102 is configured to transmit and receive data over the network 101 in communication with user devices 113a-113d. In particular, the review manager 102 receives data indicative of changes that a user at a user device wishes to suggest or create to the master document 106. The review manager 102 then creates these changes in a markup version and/or a clean version of the master document 106. In some implementations, various users may have different user types, which set the access permissions for the user to access the master document 106.

The review manager 102 may include a processor and a memory unit. The memory unit stores computer executable instructions, which are executed by the processor. The computer executable instructions include instructions for receiving data over the network 120, determining a user type for a given user, making changes to a markup version and/or a clean version of the master document 106, and publishing various versions of the document 106 to various users. As depicted in FIG. 2, the master document 106 is stored on a separate device from the server 104, but the master document 106 may also be stored in the server's electronic database 103 or even in the memory unit included within the review manager 102. In addition, any data described herein as being stored on the electronic database 103 may instead or additionally be stored in the review manager's memory unit or on a separate memory unit external to the server 104.

Users 112a-112c at user devices 113a-113c simultaneously interact with the master document 106 over interfaces at the user devices 113a-113c respectively. In one implementation, each user at a user device has a user type, such as editor, reviewer and viewer, defining a level of authority for access to and editing capabilities of certain versions of the master document 106.

Each user device 113a-113d may include a device such as a personal computer, a laptop computer, a tablet, a smart phone, a personal digital assistant, or any other suitable type of computer or communication device. Users at the user devices access and receive information from the server 104 over the network 101. The user devices 113a-113d may include typical components, for example, an input device, and output device, and a communication interface. A user may authenticate with the server 104 by inputting a user name and password (or providing other identification information) via a user interface, such that the same user device may be used by different users at different times.

Users interact with the server 104 such that the users, in conjunction with the server 104, execute an online document by collaboratively proposing changes to the document 106. Although illustrated as a single device in FIG. 2, the server 104 may be implemented as, for example, a single computing device or as multiple distributed computing devices. The interaction of users with the server 104 is through user interfaces, which may include document editing software and web browsers. For example, the document may be viewed in a selected document editing program, or an application that displays the document within a web browser may be used. In this arrangement, users do not need to install software locally to their user devices to view and make changes to the document. When browsers or user interfaces are discussed herein, these terms are intended to refer to any program that allows a user to browse documents, regardless of whether the browser program is a stand-alone program or an embedded program, such as a browser program included as part of an operating system. The logic described herein can be implemented in hardware, software, firmware, or a combination thereof.

In one example, the document 106 is a html document. One of skill in the art will understand that the features and concepts described herein may be applied in any type of collaborative document application, including, for example, spreadsheet applications, presentation applications, drawing applications, and others.

The updates to the flat data structure model version 108 and the master document 106 of the electronic document are performed nearly in real-time. This means that when multiple users 112a-112d are simultaneously viewing and accessing the document, the users can see and receive feedback regarding suggested edits almost immediately after another user makes an edit and/or sends the feedback. The system 200 is especially advantageous for the case when a user's edit may affect additional edits made by the user or any other users. In one implementation, a user may view who else is currently viewing a copy of the document. When more than one user views the document at a time, the users may communicate with each other in the document itself, or over an instant messaging application. When there are multiple users, a user may view suggested edits and comments made by other users. In this way, by allowing for efficient collaboration across a set of users proposing changes to a document, the system 200 offers significant advantages over a system in which users independently propose changes to a document. Thus, when another user views the document, the user may view a live stream of collaborative updates made by multiple other users at the same time, significantly reducing the amount of time to develop the document.

In one implementation, each user may be assigned a unique color, such that the changes in the markup version of the document are color-coded by the user who made the changes. In addition, changes made by editors may be marked differently on the markup version of the document from changes made by reviewers. Further, if a document has more than one editor, any editor may delete any comment made by a reviewer or make further edits. If a document has more than one viewer, in some embodiments, the viewers may comment on the document and may also view comments made by other users (or may only view comments made by other viewers).

FIG. 3A depicts an example of sample text from an electronic document 300, according to an illustrative embodiment. The electronic document 300 includes a first paragraph with the text "ABC" and "def", a table having one cell, and a second paragraph with the text "ghi". The electronic document 300 is displayed in a hierarchical data structure model format.

Figure 3B:
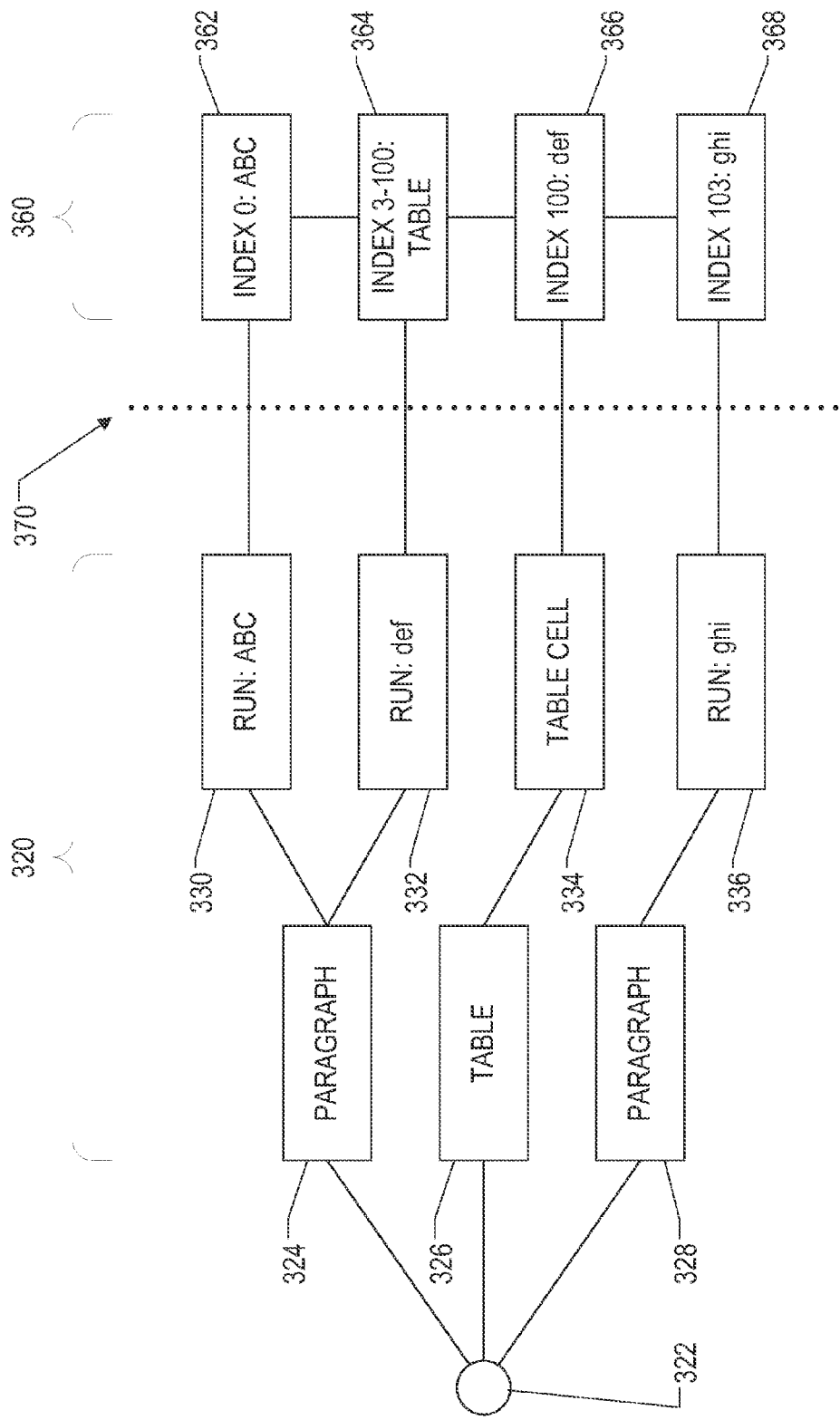
FIG. 3B depicts a hierarchical data structure model of the text mapped to a flat data structure model of the text, according to an illustrative embodiment.

FIG. 3B depicts a hierarchical data structure model 320 of the text from the electronic document 300 mapped to a flat data structure model 360 of the same text via a bridge 370, according to an illustrative embodiment. The hierarchical data structure model includes a root node 322, which has a child node for each structural element of the electronic document. As shown in FIG. 3B, the root node 322 includes a first paragraph child node 324, a table child node 326, and a second paragraph child node 328. Each of the structural element child nodes 324, 326 and 328 has one or more child nodes. The first paragraph child node 324 has a first child leaf node 330 including the instruction "Run: ABC" and a second child leaf node 332 including the instruction "Run: def". According to one implementation, the "Run" instruction results in the text following the instruction showing up as text in the electronic document. The table child node 326 has a child cell node 334, as indicated by the instruction "Table Cell". The table cell does not include any text, so the child cell node 334 also does not include any text. In one example, any text included in the cell would be represented in a child leaf node of the child cell node 334. The second paragraph child node 328 has a third child leaf node 336 including the instruction "Run: ghi". In other examples, for other electronic documents, the root node may also include child nodes representing equations, pictures, graphs, or other structural elements of the electronic document.

Each of the leaf nodes 330, 332, 334 and 336 of the hierarchical data structure model 320 is mapped to an element of a flat data structure via the bridge 370. The first child leaf node 324 is mapped to a first flat data structure element 362 and the second child leaf node 324 is mapped to a second flat data structure element 364. The child cell node 334 is mapped to a third flat data structure element 366. The third child leaf node 336 is mapped to a fourth flat data structure element 368. As shown in the flat data structure elements 362, 364, 366 and 368, the flat data structure is represented by indices. Thus, the first paragraph begins at the index 0, with "A" at index 0. "B" at index 1 and "C" at index 2. The table begins at index 3, and has separate sub-indices for elements included in the table. The table cell is represented at index 3-100. The text "def" begins at index 100. Thus, "d" is at index 100, "e" is at index 101, and "f" is at index 102. The subsequent text "ghi" begins at index 103, again with one letter at each index. According to one implementation, the flat data structure model allows real time collaboration of the electronic document 300.

Figure 3C:
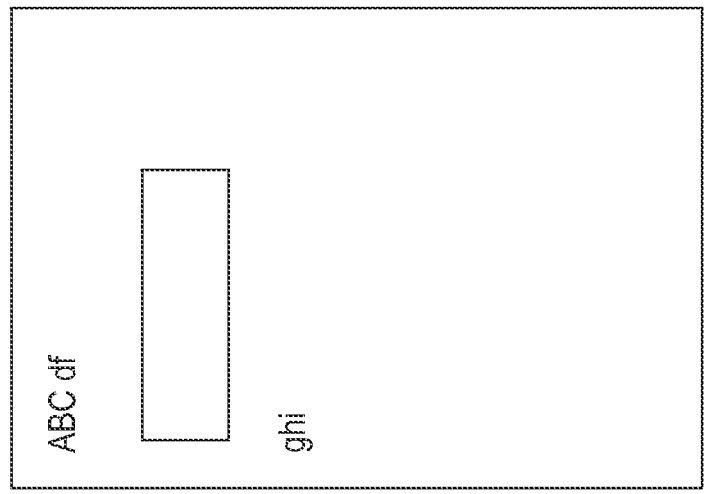
FIG. 3C depicts an edited sample text from an electronic document, according to an illustrative embodiment.

FIG. 3C depicts edited sample text from a copy 370 of the electronic document 300, according to an illustrative embodiment. The copy 370 shows the letter "e" deleted from the second word of text in the first paragraph. Thus, the second word of text in the first paragraph is "df", as opposed to "def" in the original electronic document 300 shown in FIG. 3A.

Figure 3D:
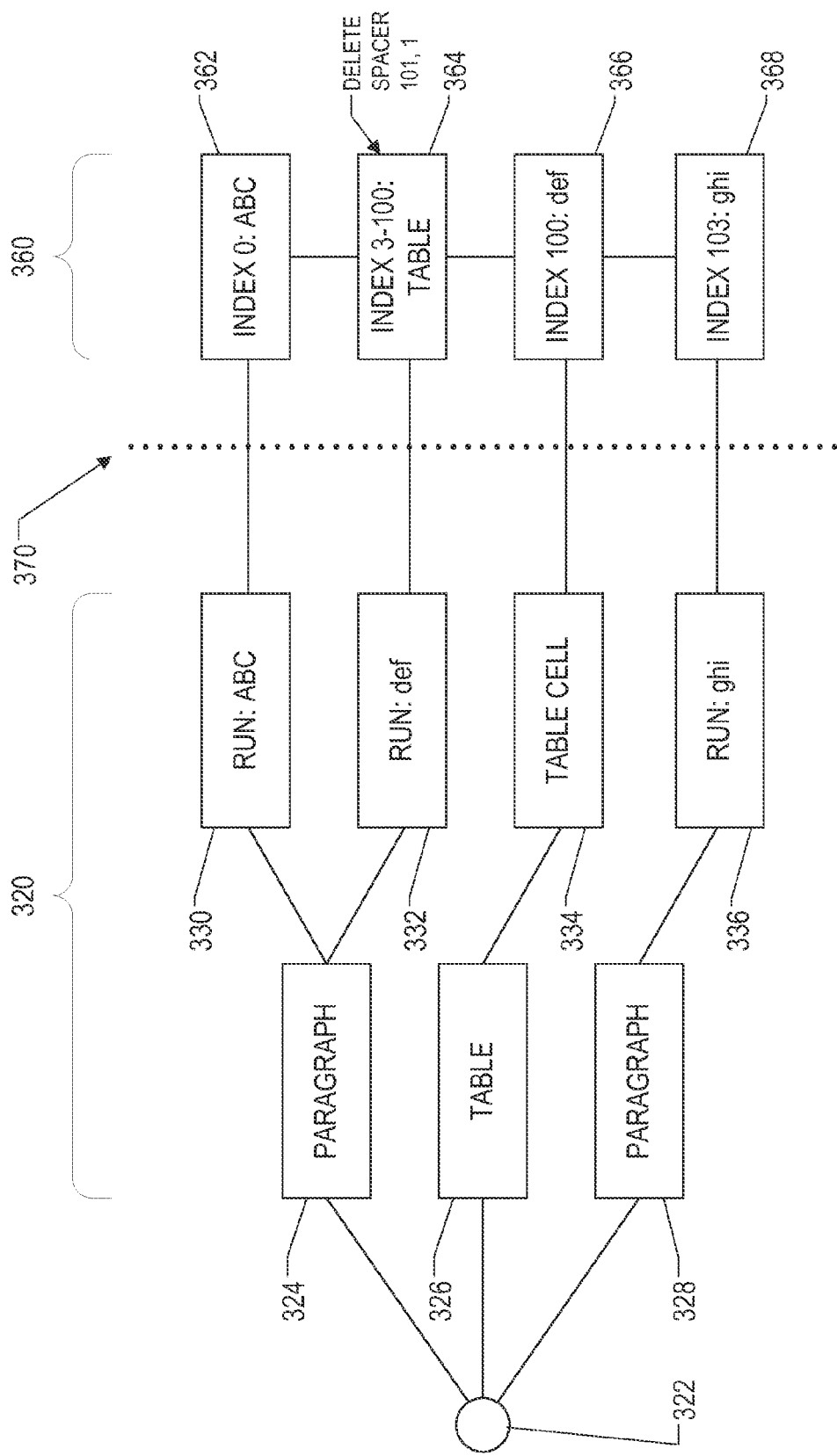
FIG. 3D depicts a flat data structure model of text, an edit to the text, and a bridge to a hierarchical data structure model of the text, according to an illustrative embodiment.

FIG. 3D depicts a flat data structure model 360 of text, an edit 380 to the flat data structure model of the text, and a bridge 370 from the flat data structure model 360 to a hierarchical data structure model 320 of the text, according to an illustrative embodiment. The edit 380 includes instructions to delete 1 character beginning at index 101. Since index 100 is the letter "d", index 101 is the following index, letter "e". Deleting one character thus comprises deleting the letter "e" from the element 364. Once this edit is made, the edit is mapped to the corresponding node 332 in the hierarchical data structure 320 via the bridge 370. Thus, the edit 380 will appear in both a flat data structure model format of the text and in a hierarchical data structure model format of the text. In some implementations, the edit to the flat data structure model 360 of the text is propagated to other flat data structure copies of the text via a network such as the network 101 of FIG. 2.

Figure 4:
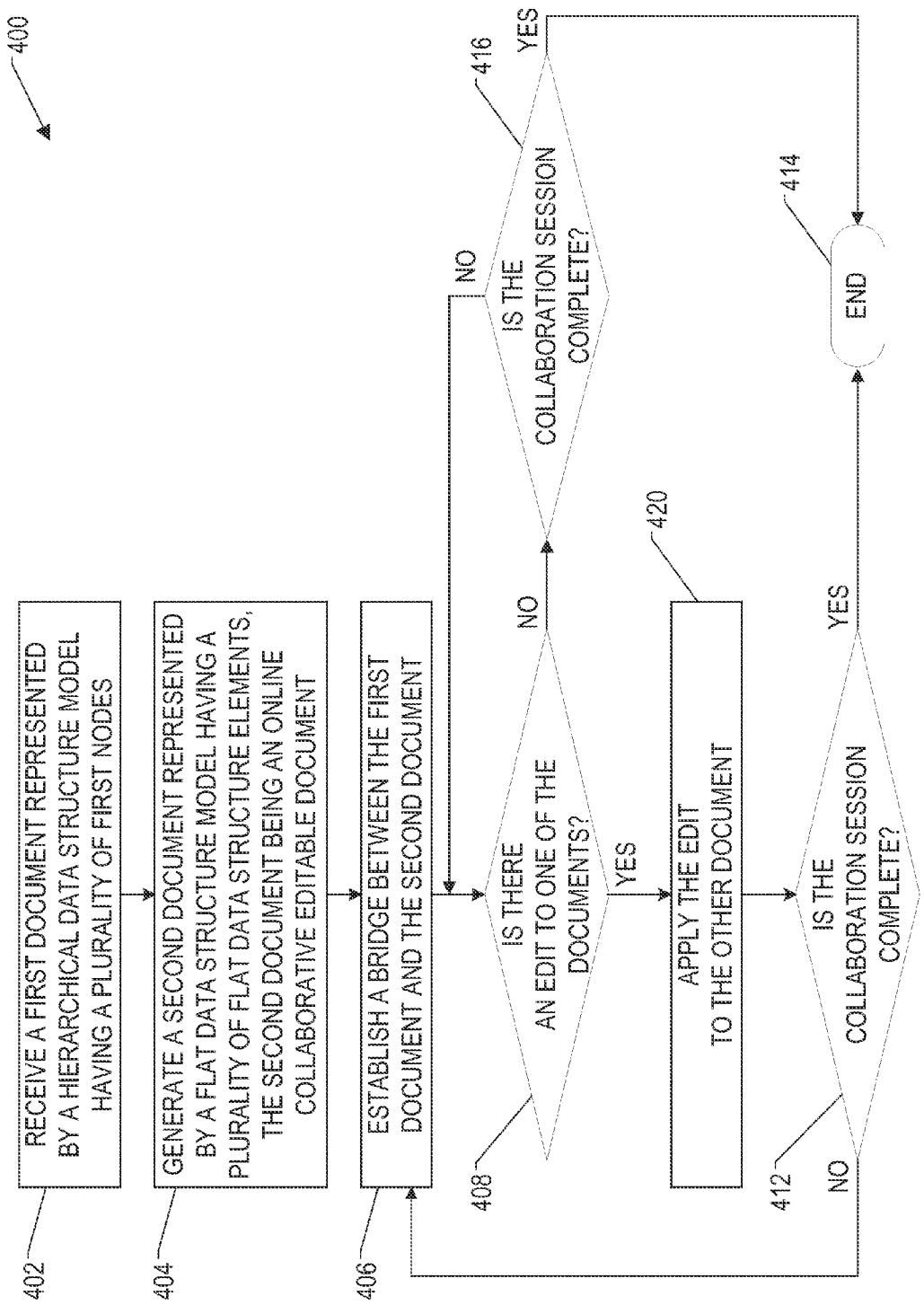
FIG. 4 depicts a flow chart of a method for establishing a bridge between two documents, according to an illustrative embodiment.

FIG. 4 depicts a flow chart of a method 400 for establishing a bridge between two documents, according to an illustrative embodiment. At step 402, a first document represented by a hierarchical data structure model having a plurality of first nodes is received. At step 404, a second document is generated, the second document represented by a flat data structure model having a plurality of flat data structure elements, the second document being an online collaborative editable document. At step 406, a bridge is established between the first document and the second document.

At step 408, the method 400 determines whether there is an edit to one of the first and second documents. In one example, an edit to one of the first and second documents triggers a notification of the edit. In another example, the first and second documents are periodically checked for edits, such as about every 10 ms, about every 25 ms, about every 50 ms, about every 100 ms, about every 250 ms, about every 500 ms, and about every 1 s. If there is an edit to one of the first and second documents, at step 420, the edit is applied to the other document. For example, an edit to the first document is applied to the second document, and an edit to the second document is applied to the first document. If there is not at edit to one of the first and second documents at step 408, the method proceeds to step 416, where the method 400 determines whether the collaboration session is complete. If the collaboration session is complete, the method 400 ends at step 414. If the collaboration session is not complete, the method 400 returns to step 408 to determine if there is an edit to one of the first and second documents.

After an edit is applied to the first or second document at step 420, the method 400 proceeds to step 412, and determines whether the collaboration session is complete. If the data collaboration session is complete, the method ends at step 414. If the collaboration session is not complete, the method returns to step 408, and determines if there is another edit to one of the first and second documents.

Figure 5:
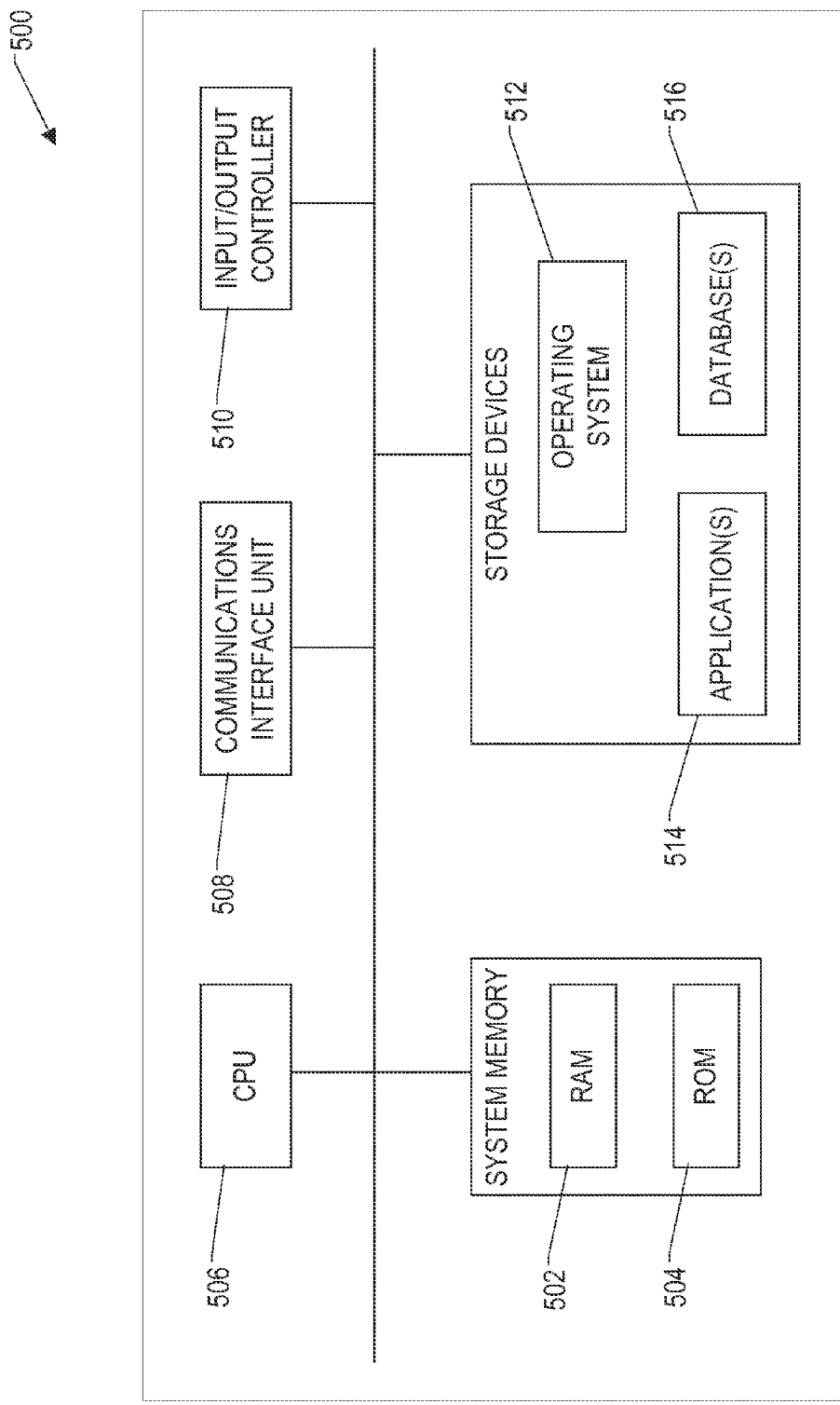
FIG. 5 depicts a block diagram of a computing device for performing any of the processes described herein.

FIG. 5 is a block diagram of a computing device, such as any of the components of the system of FIG. 1A, for performing any of the processes described herein. Each of the components of these systems may be implemented on one or more computing devices 500. In certain aspects, a plurality of the components of these systems may be included within one computing device 500. In certain implementations, a component and a storage device may be implemented across several computing devices 500.

The computing device 500 comprises at least one communications interface unit, an input/output controller 510, system memory, and one or more data storage devices. The system memory includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional stand-alone computer or alternatively, the functions of computing device 500 may be distributed across multiple computer systems and architectures. In FIG. 5, the computing device 500 is linked, via network or local network, to other servers or systems.

The computing device 500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device. The data storage device may comprise an appropriate combination of magnetic, optical or semiconductor memory, and may include, for example, RAM 502, ROM 504, flash drive, an optical disc such as a compact disc or a hard disk or drive. The CPU 506 and the data storage device each may be, for example, located entirely within a single computer or other computing device; or connected to each other by a communication medium, such as a USB port, a serial port cable, a coaxial cable, an Ethernet cable, a telephone line, a radio frequency transceiver or other similar wireless or wired medium or combination of the foregoing. For example, the CPU 506 may be connected to the data storage device via the communications interface unit 508. The CPU 506 may be configured to perform one or more particular processing functions.

The data storage device may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store information that may be utilized to store information required by the program.

The operating system 512 and applications 514 may be stored, for example, in a compressed, an uncompiled and an encrypted format, and may include computer program code. The instructions of the program may be read into a main memory of the processor from a computer-readable medium other than the data storage device, such as from the ROM 504 or from the RAM 502. While execution of sequences of instructions in the program causes the CPU 506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to integrating collaboratively proposed changes and publishing as described herein. The program also may include program elements such as an operating system 512, a database management system and device drivers that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Variations, modifications, and other implementations of what is described may be employed without departing from the spirit and scope of the invention. More specifically, any of the method, system, and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

What is claimed is:

1. A method of establishing a bridge between two documents on a server, comprising:
   receiving, at the server, a first document represented by a hierarchical data structure model having a plurality of first nodes;
   generating, by a processor, a second document represented by a flat data structure model having a plurality of flat data structure elements, the second document being an online collaboratively editable document; and
   establishing, by the processor, the bridge between the first document and the second document, including:
      linking the plurality of first nodes to the plurality of flat data structure elements, such that at least a portion of contents of the plurality of first nodes is copied to the plurality of flat data structure elements; and
      maintaining the bridge, such that an edit to the first document, represented in at least one of the first nodes, is applied to at least one corresponding flat data structure element, thereby applying the edit to the second document.

2. The method of claim 1, further comprising:
   detecting an edit to the first document; and
   applying the edit to the second document, based on the bridge linking the plurality of first nodes and the plurality of flat data structure elements.

3. The method of claim 2, wherein applying the edit to the second document includes using operational transformation to apply the edit.

4. The method of claim 1, wherein maintaining the bridge further comprises applying an edit to the second document, represented in at least one of the flat data structure elements, to at least one corresponding first node, thereby applying the edit to the first document.

5. The method of claim 1, further comprising:
   generating a copy of the second document represented by an additional flat data structure having a plurality of additional flat data structure elements; and
   establishing an additional bridge between the copy and the second document, such that an edit to the second document is applied to the copy.

6. The method of claim 5, wherein the edit to the first document is applied to the second document via the bridge, and is applied from the second document to the copy via the additional bridge.

7. The method of claim 1, further comprising distributing a plurality of first copies of the first document to a plurality of second processors, each first copy represented by respective hierarchical data structure models and a plurality of corresponding second copies, each second copy represented by respective flat data structure models.

8. The method of claim 7, wherein a change to one of the first copies is applied to a corresponding one of the second copies, the change to the corresponding one of the second copies is applied to the second document and the plurality of second copies, the change to the second document is applied to the first document, and the change to the plurality of second copies is applied to the plurality of first copies.

9. The method of claim 6, wherein a first user editing the first document collaborates in real time with a second user editing one of the plurality of first copies.

10. The method of claim 1, wherein at least one of the plurality of flat data structure elements contains no data.

11. A system for establishing a bridge between two documents, comprising
   a server, configured to store the two documents;
   a receiver, coupled to the server, for receiving a first document represented by a hierarchical data structure model having a plurality of first nodes;
   a first processor, coupled to the server, for generating a second document represented by a flat data structure model having a plurality of flat data structure elements, the second document being an online collaboratively editable document, and for establishing the bridge between the first document and the second document,
   wherein establishing the bridge includes:
      linking each of the plurality of first nodes to the plurality of flat data structure elements via a linkage, such that at least a portion of contents of the plurality of first nodes is copied to the plurality of flat data structure elements; and
      maintaining the bridge, such that an edit to the first document, represented in at least one of the first nodes, is applied to at least one corresponding flat data structure element, thereby applying the edit to the second document.

12. The system of claim 11, wherein the first processor is further configured to:
    detect an edit to the first document; and
    apply the edit to the second document, based on the linkage between the plurality of first nodes and the plurality of flat data structure elements.

13. The system of claim 11, wherein the processor is configured to maintain the bridge such that an edit to the second document, represented in at least one of the flat data structure elements, is applied to at least one corresponding first node, thereby applying the edit to the first document.

14. The system of claim 11, further comprising a transceiver, configured to transmit a copy of the second document to a user device including a second processor, wherein the copy is represented by an additional flat data structure having a plurality of additional flat data structure elements; and
    wherein the first processor is configured to establish an additional bridge between the copy and the second document, such that a first edit to the second document is applied to the copy.

15. The system of claim 14, wherein the first processor is configured to apply the edit to the first document to the second document via the bridge, wherein the transceiver is configured and to apply the edit from the second document to the copy via the additional bridge.

16. The system of claim 11, further comprising a transceiver, configured to transmit a first copy of the first document to a user device including a second processor, wherein the first copy is represented by an additional hierarchical data structure having a plurality of additional nodes, wherein the second processor is configured to generate a second copy represented by an additional flat data structure having a plurality of additional flat data structure elements, and a second bridge between the first copy and the second copy; and
    wherein the first processor is configured to establish a third bridge between the second copy and the second document, such that a first edit to the second document is applied to the second copy.

17. The system of claim 16, wherein the second processor applies a change to the first copy to the second copy via the second bridge, the user device transmits the change to the first processor, and the first processor applies the change to the second document and to the first document via the bridge.

\* \* \* \* \*